(12) United States Patent
Yazghi et al.

(10) Patent No.: US 8,823,193 B1
(45) Date of Patent: Sep. 2, 2014

(54) METHOD AND SYSTEM FOR LIMITATION OF POWER OUTPUT VARIATION IN VARIABLE GENERATION RENEWABLE FACILITIES

(71) Applicants: Najlae M Yazghi, Orlando, FL (US);
Robert J. Nelson, Orlando, FL (US);
Hongtao Ma, Orlando, FL (US);
William F. Clark, Oviedo, FL (US)

(72) Inventors: Najlae M Yazghi, Orlando, FL (US);
Robert J. Nelson, Orlando, FL (US);
Hongtao Ma, Orlando, FL (US);
William F. Clark, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/903,305

(22) Filed: May 28, 2013

(51) Int. Cl.
*F03D 9/00* (2006.01)

(52) U.S. Cl.
USPC ............................................. 290/44; 307/43

(58) Field of Classification Search
USPC ................................... 290/43, 44, 55; 307/43
See application file for complete search history.

(56) References Cited

U.S. PATENT DOCUMENTS

| | | | | |
|---|---|---|---|---|
| 7,298,059 | B2* | 11/2007 | Delmerico et al. | 307/85 |
| 7,923,853 | B2* | 4/2011 | Lewis | 290/44 |
| 8,283,803 | B2* | 10/2012 | Fortmann et al. | 307/43 |
| 8,301,311 | B2* | 10/2012 | Nelson | 700/287 |
| 8,688,286 | B2* | 4/2014 | Nelson et al. | 700/297 |
| 2011/0012352 | A1* | 1/2011 | Nelson et al. | 290/44 |

* cited by examiner

*Primary Examiner* — Nicholas Ponomarenko

(57) ABSTRACT

A method and system for controlling the output power from a renewable energy installation (10) to a utility grid (56) having a predetermined bound for a variation in output power per unit of time is provided. The method and system includes constraining an output signal of a controller (76) to an upper and/or lower limit via a limiter (78), wherein the upper and/or lower limit comprises a predetermined upper and/or lower bound for a variation in output power per unit of time. The constrained output signal is then applied to the plurality of electricity generators (12, 14, 16) to limit the variation in output power per unit of time according to the predetermined bound.

26 Claims, 2 Drawing Sheets

METHOD AND SYSTEM FOR LIMITATION OF POWER OUTPUT VARIATION IN VARIABLE GENERATION RENEWABLE FACILITIES

FIELD OF THE INVENTION

The invention relates to a method and system for limiting power output variation in variable generation renewable facilities

BACKGROUND OF THE INVENTION

Electricity generation is the process of converting the power from an energy source into electricity. Sources of energy can include renewable energy sources, derived from natural processes that are replenished constantly, including, for example, sunlight, wind, rain, tides, waves and geothermal heat. There are a number of renewable generation facilities that use electricity generators to convert the power from an energy source into electricity, including solar photovoltaic (PV) cells, solar power generators, thermoelectric generators, tidal electricity generators, wind power generators/turbines, and other electric generators using any other source of energy. Renewable generation facilities can be appropriately connected to deliver power to a load, an electrical grid for further distribution, and/or an energy storage device/system that banks electrical power (such as pumped hydro, compressed air, flywheels, and battery energy storage, as known in the art).

Specifically, power can be generated via a wind-farm wherein the electricity generators are wind turbines used convert the power in the wind to electricity. Wind farms are created when multiple wind turbines are placed in the same geographic area for the purpose of generating large amounts of electrical power for delivery to a utility grid. Recently, the fraction of energy added to utility grids by wind farms has increased dramatically. Therefore, there is a need for controlling wind farms delivering energy to utility grids with respect to a number of parameters prescribed by the utility grid operators.

Wind power is variable because wind speed is necessarily variable. Generally, wind power varies as a cube of wind speed. Consequently, even relatively small changes in wind speed result in significant changes in wind power. For example, an increase in wind speed from 9 m/s to 10 m/s may result in an increase of wind power of almost 40%. Wind gusts can cause even more of a concern. Sometimes this increase in wind power exceeds a maximum allowable variation in wind park output prescribed by transmission system/utility grid operators, particularly in small power systems. For example, in systems like Hawaii, operators require that the plant MW output not vary by more than a certain +/− change in MW from the output measured "n" seconds earlier.

Attempts have been made to control wind farm power including control schemes for controlling power ramp rate of a wind farm, such as that described in U.S. Pat. No. 7,679, 215. The wind farm power rate control method described therein attempts to limit the rate of change of collective power output by generating a power output rate limiting signal based on the monitored rate of change of collective power output of the wind turbine generators and a desired collective power ramp of the wind turbine generators and applying the power output rate limiting signal to the plurality of wind turbine generators. In operation, when the actual wind farm power ramp rate increases above the ramp rate request, the controller adjusts the wind farm ramp rate, causing actual power output to fall below the ramp rate request. As a result, the arithmetic sum over a one minute time duration is zero. However, although this scheme provides for an "average" ramp rate that coincides with a ramp rate request, the wind farm power still exceeds the maximum allowable plant output power during this time frame and, thus, fails to meet the requirements of grid operators for the output to not vary by more than a certain +/− change in power from the output measured "n" seconds earlier.

Some disadvantages of this scheme include: ramp rate limits can be exceeded for a short period of time; non-optimal power production due to the fact that the power is being controlled by a turbine ramp rate instead of a turbine power setpoint; and, finally this control requires a ramp rate control in the wind turbines.

In view of these variations in wind power that cause the output power to vary beyond prescribed limits and the shortfalls of the prior attempts, there is a need in the art for a system and method to limit the output power to comply with the transmission system/utility grid operators' requirements. There is a further need in the art to provide a control mechanism that performs an output control function to bound the variation in wind park output to comply with the transmission system/utility grid operators' requirements. There is a further need in the art for a system and method to maintain frequency and load-generation balance.

The present invention is designed to address these needs.

BRIEF DESCRIPTION OF THE DRAWINGS

The invention is explained in the following description in view of the drawings that show.

DETAILED DESCRIPTION OF THE INVENTION

Figure 1:
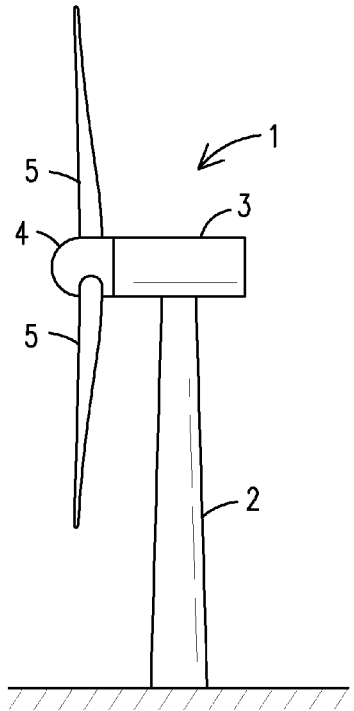
FIG. 1 is a schematic drawing depicting a typical assembled wind turbine.

In accordance with one or more embodiments of the present invention, structural arrangements and/or techniques conducive to improvements in limiting output variation in power generation systems are described herein. In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Broadly speaking, the invention provides a method, system, apparatus, and non-transitory tangible computer-readable media for limiting rate variation in a renewable energy installation, such as a wind park. Embodiments of the invention provide a control mechanism/scheme that performs an output control function to bound the variation in wind park output to comply with power output requirements, such as those prescribed by the transmission system/utility grid operators' requirements.

The invention can be implemented in numerous ways, including as a system, a renewable energy arrangement, a device/apparatus, a computer-implemented method, or a non-transitory computer readable medium containing instructions to implement the method. As a system, an embodiment of the invention includes a memory, input/output devices, a processor unit, communication means, and an optional display device and/or optional database. The methods of the present invention may be implemented as a computer program product with a non-transitory computer-readable medium having code thereon. As an apparatus, the present invention may include electronic devices programmed and/or operating in accordance with the steps of the present invention.

In an embodiment of the present invention, the method is used for controlling the output power from a renewable energy installation by controlling an output power of a plurality of electricity generators (e.g., wind turbines) using monitored power signals. The controlling process includes processing the monitored power signals via a controller to produce an output signal; constraining the output signal to an upper limit via a limiter, wherein the upper limit comprises a predetermined upper bound for a variation in output power per unit of time; and applying the constrained output signal to the plurality of electricity generators to limit the variation in output power per unit of time according to the predetermined bound.

In further embodiments, processing the monitored power signals includes determining a schedule power based on a predetermined bound for a variation in output power per unit of time with respect to an output power measured at an earlier unit of time; computing an error signal from a difference between the schedule power and a measured power; and processing the error signal via a control algorithm of a controller to produce the output signal. Power signals of the renewable energy installation are monitored by receiving one or more power signals from one or more sensors. Control signals comprising an active power setpoint are output to control one or more operating parameters of one or more individual electricity generators in the renewable energy installation. A central controller operable to monitor and control a collective power output of the plurality of electricity generators may be utilized. The central controller may also be used to control an energy storage system of the renewable energy installation.

Generally, the predetermined bound for the variation in output power per unit of time is prescribed by a utility grid or other application that receives the output power. The predetermined bound can be communicated as a bound whose output may not vary by more than a specified change in output power from an output power measured at a specified earlier unit of time.

In further embodiments, the monitored power signals are processed via active power control that applies via a control algorithm of a controller one or more of proportional, integral, and derivative values to an input signal to produce the output signal. Thereafter, the output signal of the controller is constrained to a lower limit via the limiter, wherein the lower limit is a predetermined lower bound for a variation in output power per unit of time. For example, when the output signal remains at or below the upper bound, the constrained output signal of the limiter is substantially equal to the output signal, and when the output signal exceeds the upper bound, the constrained output signal of the limiter is substantially constant and constrained to the upper bound value.

Generally, in operation, the method and system uses a control mechanism to comply with power company requirements to keep within certain prescribed bounds representing a +/− change in MW of the output recorded in each earlier time step. In this manner, the control mechanism will limit in every time step output power variation rate to comply with the utility's requirement by sending an active power setpoint to the wind turbines that comply with the utility's requirements.

In a conventional manner, as shown in FIG. 1, an assembled wind turbine 1 includes a tower 2, a nacelle 3 and a rotor including a hub 4 with rotor blades 5. The nacelle 3 is rotatably mounted on the tower 2 around a yawing axle (not shown). A yaw control motor (not shown) is located between the tower 2 and the nacelle 3 to yaw the nacelle based on wind direction. The wind direction is typically measured by use of a wind vane or by use of a sonic wind sensor (not shown). To achieve optimum conversion of wind power into electrical power the rotor axis is aligned with the wind direction.

Figure 2:
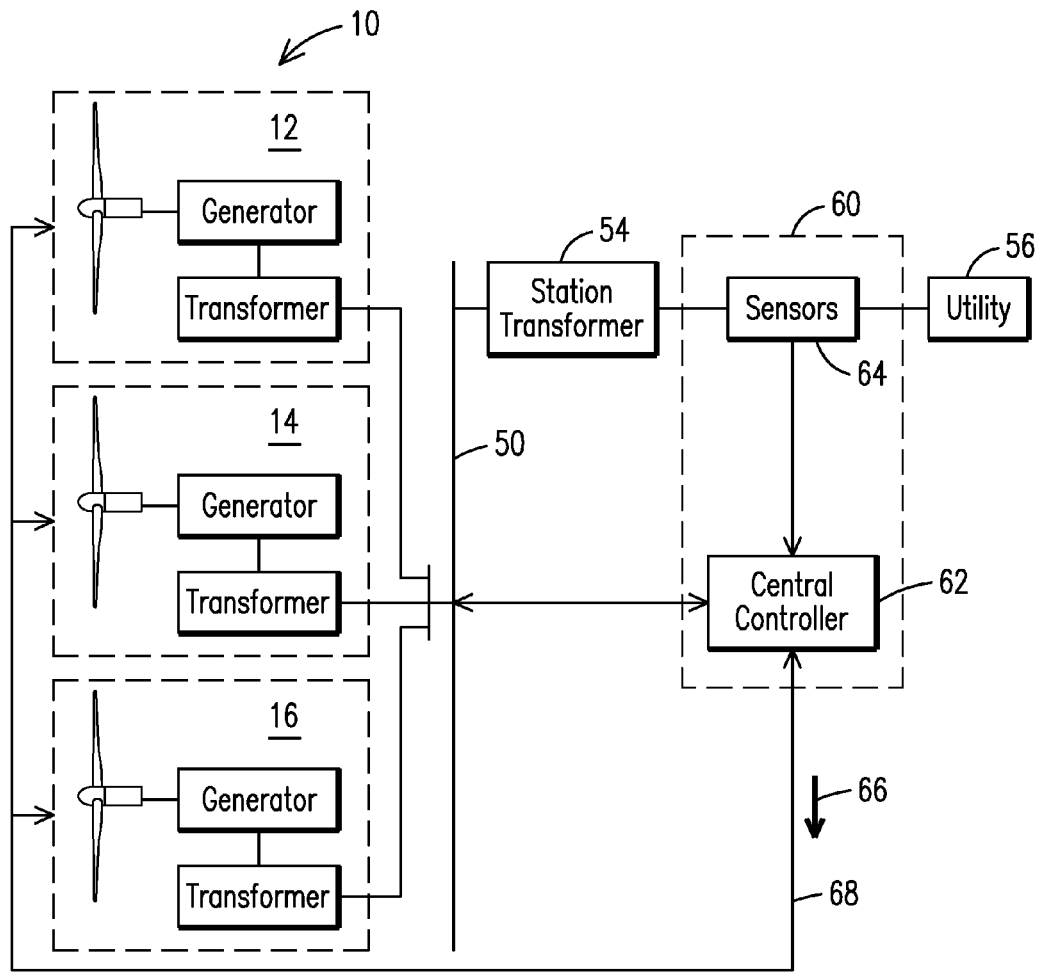
FIG. 2 is a schematic of an example embodiment of a power generation system, (e.g., a wind farm) that can benefit from aspects of the present invention.

FIG. 2 is a schematic of an example embodiment of a power generation system, such as a wind farm 10 having a plurality of wind turbines that may benefit from aspects of the present invention. In this example embodiment, wind farm 10 comprises three wind turbine systems 12, 14, 16 (hereinafter referred to as wind turbines) which are coupled to respective generators and associated power converting electronics/transformers in an example interconnecting arrangement.

It will be appreciated that the number of wind turbines is not limited in any way to three wind turbines. Additionally, aspects of the present invention are not limited to the specific example of wind turbine implementation shown in FIG. 2 being that other kinds of implementations are possible for the wind turbines. For example, DFIG (Doubly-fed Induction Generator) and DD (direct-drive) wind turbine implementations, in addition to the geared full-converter implementation shown FIG. 2, can similarly benefit from aspects of the present invention. Moreover, aspects of the present invention are not limited to wind turbines located in any particular region and can apply on world-wide basis.

Specifically, as shown in FIG. 2, each wind turbine 12, 14, 16 comprises a respective rotor with a rotor shaft transmitting the torque of a turning rotor to a respective gear box (not shown). The gear boxes are arranged to transmit rotation from rotors to output shafts with a certain gear ratio. Each output shaft is mechanically coupled to the respective rotor of an AC (alternating current) generator (GEN) which respectively transforms the mechanical power provided by the rotation of the output shafts into electrical power. Electrical power produced by generators (GEN) may be stepped up in voltage by turbine transformers (TRANSF) thereafter coupled to a distribution network 50. By way of example, the AC generators may be synchronous generators. In a synchronous generator, the rotor rotates with the same rotational frequency as the rotating magnetic field produced by the stator of the generator or with an integer relationship with the frequency of the rotating magnetic field, depending on the number of poles present in the rotor. The generators (GEN) are variable speed generators, i.e., the rotational speeds of the respective rotors are allowed to vary, for example, depending on wind conditions.

A feeder may be used to couple power outputs of wind turbines for supply to the distribution network 50. In a typical application, the distribution network 50 couples power from multiple feeders (not shown), each feeder coupling power outputs of a plurality of wind turbines 12, 14, 16. A station transformer 54 may be used to step up voltage of the power from the distribution network 50 to a transmission voltage required by the utility 56.

In the illustrated embodiment, the wind farm 10 includes a wind farm control system 60 comprising a controller such as a central controller 62 and sensors 64. In the illustrated embodiment, the wind farm control system 60 is operable to monitor and control the wind farm 10 using an output control function to bound the variation in wind park output to comply with the transmission system/utility grid operators' requirements. The wind farm control system 60 further comprises sensors 64, such as power, voltage, and/or current sensors, which are configured to sense individual and/or collective power output of the wind farm 10. Sensors 64 may be coupled to an output of the station transformer 54 (as illustrated in FIG. 2) or to a suitable point in the distribution network 50 or elsewhere as known in the art to provide suitable monitoring.

Specifically, the wind farm control system 60 is operable to generate a control signal 66, e.g., a power output variation control signal, based on monitored signals per unit of time (e.g., using appropriate sensors 64) and a limit of change in the output prescribed by the utility 56. The control system 60 transmits such control signals 66 via communication link 68 to one or more wind turbines 12, 14, 16 of the wind farm 10 to control the rate of change of the output by controlling one or more operating parameters of the one or more individual wind turbines 12, 14, 16.

Data communication via communication means between the individual turbines and the control mechanism 60 may be implemented in hardware and/or software, via wired or wireless links. Such data communications may comprise, for example, signals indicative of operating conditions/states of the wind turbines 12, 14, 16 transmitted to the central controller 62 as well as control signals communicated by the central controller 62 to individual wind turbines 12, 14, 16. The central controller 62 may further be in communication with the distribution network 50, and may be operable to control various switching devices in the network 50, so as to control the power output of the wind farm 10 within specifications prescribed by the grid operators. Additional signal and control communication links may be provided as known in the art.

The control system 60 may comprise a central controller 62 (as shown in FIG. 2) operable to monitor and control a collective power output of a plurality of wind turbines in the wind farm, or one or more suitable individual controllers (not shown) operable to monitor and control individual power outputs of a plurality of wind turbines in the wind farm.

Figure 3:
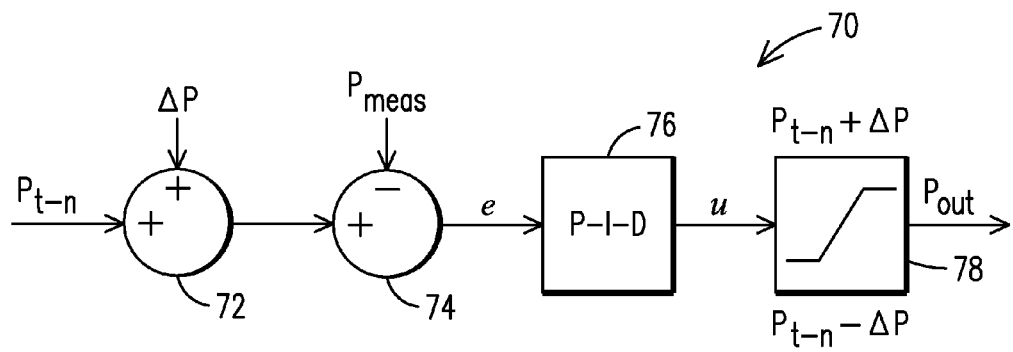
FIG. 3 is a block diagram depicting a control mechanism for ramp rate control at the turbine level according to aspects of an embodiment of the invention.

Turning now to FIG. 3, a control scheme 70 for variation control that limits the output to within certain stipulated bounds according to aspects of an embodiment of the invention is illustrated. The control scheme 70 is operable to generate a control signal 66, e.g., a power output rate limiting signal, based on monitored signals per unit of time and a limit of change in the output prescribed by the utility 56. The utility may prescribe, for example, that the farm's power output may not vary by more than $\Delta P$ from the output measured "n" seconds earlier, even when available power is greater than prescribed. To comply with this requirement, the control scheme is operable to control the rate of change of the output by controlling one or more operating parameters of the one or more individual wind turbines.

In this particular diagram of FIG. 3, the schedule power is assumed to be the most likely case of maximum value, which is "$P_{t-n}+\Delta P$" obtained at summing junction 72, wherein "$P_{t-n}$" represents the power at a time "n" seconds earlier and "$\Delta P$" represents the maximum prescribed variation or bound for which the farm's power output may not vary. However, any value in the range "$P_{t-n}+/-\Delta P$" may be selected. The schedule power $P_{t-n}+\Delta P$ is compared to the measured power $P_{meas}$ (sensed by power sensors 64) at difference junction 74, the output (error e) of which is input to controller 76 for active power control. The controller 76 processes the error e using values such as proportional, integral, and derivative values, summed to calculate the output u of the controller as known in the art. Controller 76 may comprise a PID, PI, PD, P or I controller as dictated by the particular requirements with proper tuning for the desired control response. Controller 76 may be implemented in programmable logic controllers (PLCs), digital controllers, or as a software implementation via a particular control algorithm.

In order to limit the controller output u to within certain stipulated bounds according to aspects of an embodiment of the invention, a limiter 78 implemented via hardware and/or software is provided at the output of the controller 76. The limiter 78 is operable to limit the output u of the controller to within certain stipulated bounds in the range of "$P_{t-n}+/-\Delta P$" wherein "$P_{t-n}+\Delta P$" represents an upper bound and "$P_{t-n}-\Delta P$" represents a lower bound. If a lower bound is not requested or needed, then the limiter 78 may be designed to provide only the upper bound, e.g., "$P_{t-n}+\Delta P$". By bounding the output u of the controller to between the range of "$P_{t-n}+/-\Delta P$", variations in the output u from the controller which exceed these bounds will be constrained to that prescribed by the utility grid. The range $P_{t-n}+/-\Delta P$ may be considered a maximum range and any value in that range may be selected as dictated by the particular requirements.

The limiter 78 is configured such that output signal $P_{out}$ of the limiter 78 is limited by a maximum value (and optionally a minimum value) defined by the upper bound of the limiter 78. In operation, output $P_{out}$ of the limiter 78 is equal to output u of the controller as the input to the limiter 78 ($P_{out}$=u) until the input exceeds the upper bound, in which case output signal $P_{out}$ of the limiter 78 is substantially constant and constrained to the upper bound value, e.g., $P_{out}=P_{t-n}\Delta P$. The output signal $P_{out}$ at the lower bound may be constrained in the same manner, $P_{out}=P_{t-n}-\Delta P$.

By placing the limiter 78 after the controller 76, the control mechanism will limit for each time step (e.g., per second) the output power variation rate to comply with the utility's requirement. The output signal $P_{out}$ of limiter 78 is communicated to the wind turbines for control. Set points are then calculated based on this control signal. By providing each turbine with a power set-point, the turbines in the farm can then use their local wind turbine controller to track this power set-point and activate corresponding pitch control, or the like. The control scheme in FIG. 3 may be implemented via the central controller 62 of FIG. 2 or via individual controllers or distributed controllers.

Broadly speaking, in operation the output power from a wind energy installation (wind park/farm) is controlled to meet the requirements of an electrical grid operator having a predetermined bound for a variation in output power per unit of time by constraining an output signal of a controller to an upper and/or lower limit via a limiter, wherein the upper and/or lower limit comprises a predetermined upper and/or lower bound for a variation in output power per unit of time. The constrained output signal is then applied to the plurality of wind turbine generators to limit the variation in output power per unit of time according to the predetermined bound. Prior to input into the controller, the schedule power is determined based on the predetermined bound for a variation in output power per unit of time and an output power measured at an earlier unit of time. An error signal is computed from the difference between the schedule power and a measured power and the error signal is processed via a control algorithm of a controller.

Figure 4:
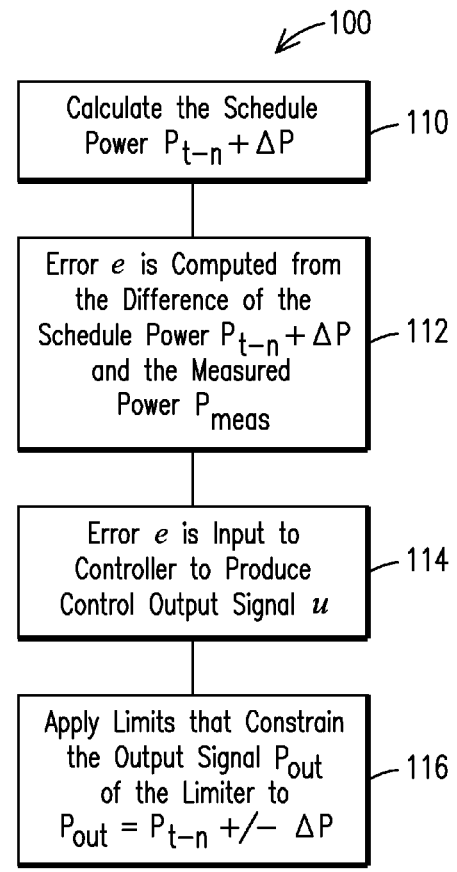
FIG. 4 is a flowchart showing operation of an embodiment of the invention.

Turning now to FIG. 4, a flowchart 100 showing operation of an embodiment of the invention is shown. As a first step 110, the limit of change in the output prescribed by the utility $\Delta P$ and the power at a time "n" seconds earlier $P_{t-n}$ are received as inputs to calculate the schedule power $P_{t-n}+\Delta P$. Next, at step 112, error e is computed from the difference of the schedule power $P_{t-n}+\Delta P$ and the measured power $P_{meas}$ (sensed by power sensors). This error e is input at step 114 to controller (e.g., P-I controller) to produce control output signal u. Thereafter, control output signal u is input into limiter at step 116 to apply limits that constrain the output signal $P_{out}$ of the limiter to $P_{out}=P_{t-n}+/-\Delta P$, wherein when control output signal u falls between $P_{t-n}+/-\Delta P$, $P_{out}=u$, else $P_{out}$ is constrained to the upper or lower limit as appropriate $P_{out}=P_{t-n}+/-\Delta P$. The control scheme is repeated for each unit of time so that the farm's power output will not vary by more than $\Delta P$ from the output measured "n" seconds earlier.

Figure 5:
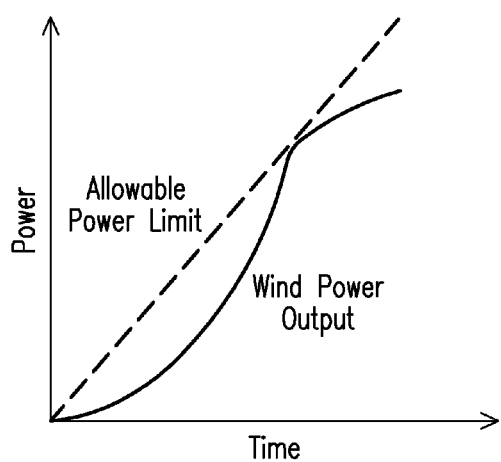
FIG. 5 is a graphical illustration showing the results of the control scheme of an embodiment of the invention.

FIG. 5 is a graphical illustration showing the results of limiting in the every time step the output power variation rate of an embodiment of the invention. As shown therein, at no time does the wind farm's power output vary by more than $\Delta P$ from the output measured "n" seconds earlier, thereby keeping the output power variation within specified levels.

The following is an example scenario to illustrate the operation of the invention. In this example, a power system operator may require that the power output from a wind plant increase by no more than 2 MW/minute, irrespective of wind conditions. This requirement means that if the output is 20 MW at t=0 seconds, the output at t=60 seconds should not exceed 22 MW. And if the output at t=2 seconds is 21 MW, the output at t=62 seconds not exceed 23 MW, etc. The check may be every one or two seconds, for example. The reason for this requested limitation is that a faster rate of output increase may cause the system to trip some local generators that have limits on how quickly they can ramp down.

Generally, active power control (e.g., P-I control) is provided that either tries to maximize the amount of power or hold it to a schedule (P=constant). The P (proportional) part of the control tries to change the power output to minimize the instantaneous error with the setpoint power and the I (integral) part of the control tries to minimize the average error over time. Since unconstrained power output from a wind turbine varies as the cube of the wind speed, even relatively small wind gusts can cause large variations in output power. The integral part of the control smoothes out these variations to some degree, but if there is a short-term reduction in wind speed the integral part will actually supplement the proportional part to increase the power output. Thus, a lull followed by a gust may result in output power increasing by even more than the cube of wind speed. If the park is putting out 20 MW, for example, at 7 m/s and the wind speed drops to 6 m/s for 10 seconds, the output power would drop by almost 40% to 12.5 MW over the next 10 seconds. If the wind speed subsequently increases to 8 m/s for 10 seconds, the power output would jump to almost 30 MW. If the park is holding to a scheduled 20 MW, the P part of the control will try to reduce the increase above 20 MW, but the I part will try to average out the reduced output, so it will try to force the park output to go well above 20 MW. If the park is unconstrained (i.e., trying to get to max power, which might be, say 50 MW), both the P and the I will work together to try to maximize the output power when the wind speed increases.

To address this issue, the present control scheme will allow the power to increase, but at a rate not exceeding the limit imposed by the grid operator. By placing the limiter after the P-I controller, the output is limited to the constrained amount (or less) regardless of what the active power controls tell the turbine to do.

Accordingly, an advantage of the present invention is that the control mechanism/scheme will maximize energy production from a wind park while simultaneously keeping the output power variation within specified levels. A particular advantage in high gust areas like Hawaii is that the control mechanism can be used to comply with power company requirements to keep within certain prescribed +/- change in MW of the output recorded in each earlier time step.

Based on the foregoing specification, the invention may be implemented using a variety of renewable energy systems/installations having variable output in addition to wind turbine systems (e.g., electricity generators that derive energy from sunlight, rain, tides, waves and/or geothermal heat as the energy source). These systems may be connected to a load, a utility grid, or an energy storage device, or a combination thereof. These systems may also be used in situations including distributed generation, hybrid power systems, offshore wind energy, installations in severe climates, special purpose applications (pumping, heating, etc.), energy storage, and fuel production. With respect to energy storage applications, energy storage devices may include any desired storage device with a storage capacity (e.g. batteries, pumped hydro-electric, fuel cells, flywheels, compressed air, or combinations thereof) being dependent upon system requirements. Suitable control devices may provide commands to the energy storage device as well as other components of the system.

Moreover, the invention may be implemented on a computer or computing/processing device(s) using computer programming or engineering techniques including computer software, firmware, hardware or any combination or subset thereof. Any such resulting program, having computer-readable code thereon, may be embodied or provided within one or more non-transitory computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc.

One skilled in the art of computer science will easily be able to combine the program code created as described with appropriate general purpose or special purpose computer hardware to create a computer system or computer sub-system pr processing device embodying the method of the invention. An apparatus for making, using or selling the invention may be one or more processing systems including, but not limited to, sensors, a central processing unit (CPU), a processor, memory, storage devices, communication links and devices, servers, I/O devices, or any sub-components of one or more processing systems, including software, firmware, hardware or any combination or subset thereof, which embody the invention. User input may be received from a keyboard, mouse, pen, voice, touch screen, or any other means by which a human can input data into a computer, including through other programs such as application programs. Data input may be received from any of a number of sensors or data input devices in communication therewith, wired or wirelessly. Output may comprise a computer monitor, television, LCD, LED, or any other means to convey information to the user. Output may further comprise data adapted to control external devices, such as a wind turbine, in communication therewith, wired or wirelessly.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for controlling the output power from a renewable energy installation, comprising:
   controlling an output power of a plurality of electricity generators using monitored power signals, wherein the controlling comprises:
   (a) processing the monitored power signals to produce an output signal;
   (b) constraining the output signal to an upper limit via a limiter, wherein the upper limit comprises a predetermined upper bound for a variation in output power per unit of time;
   (c) applying the constrained output signal to the plurality of electricity generators to limit the variation in output power per unit of time according to the predetermined bound.

2. The method of claim 1, wherein processing the monitored power signals comprises:
   determining a schedule power based on a predetermined bound for a variation in output power per unit of time with respect to an output power measured at an earlier unit of time;
   computing an error signal from a difference between the schedule power and a measured power; and
   processing the error signal via a control algorithm of a controller to produce the output signal.

3. The method of claim 1, further comprising monitoring power signals of the renewable energy installation by receiving one or more power signals from one or more sensors.

4. The method of claim 1, wherein applying the constrained output signal to the plurality of electricity generators comprises communicating control signals comprising an active power setpoint to control one or more operating parameters of one or more individual electricity generators in the renewable energy installation.

5. The method of claim 1, wherein controlling an output power of a plurality of electricity generators comprises controlling via a central controller operable to monitor and control a collective power output of the plurality of electricity generators in the renewable energy installation.

6. The method of claim 1, further comprising receiving the predetermined bound for the variation in output power per unit of time prescribed by a utility grid.

7. The method of claim 6, wherein the predetermined bound is communicated as a bound whose output may not vary by more than a specified change in output power from an output power measured at a specified earlier unit of time.

8. The method of claim 1, wherein processing the monitored power signals comprises active power control that applies via a control algorithm of a controller one or more of proportional, integral, and derivative values to an input signal to produce the output signal.

9. The method of claim 1, further comprising constraining the output signal of the controller to a lower limit via the limiter, wherein the lower limit comprises a predetermined lower bound for a variation in output power per unit of time.

10. The method of claim 1, wherein constraining the output signal comprises:
    when the output signal remains at or below the upper bound, the constrained output signal of the limiter is equal to the output signal, and
    when the output signal exceeds the upper bound, the constrained output signal of the limiter is substantially constant and constrained to the upper bound value.

11. The method of claim 1 wherein the electricity generators comprise wind turbines.

12. The method of claim 1 further comprising controlling via a central controller an energy storage system of the renewable energy installation.

13. A system for controlling the output power from a renewable energy installation, comprising
    a control device for controlling an output power of a plurality of electricity generators using monitored power signals, wherein the control device comprises:
    (a) a controller that processes the monitored power signals to produce an output signal;
    (b) a limiter that constrains the output signal of the controller to an upper limit, wherein the upper limit comprises a predetermined upper bound for a variation in output power per unit of time,
    wherein the control device transmits the constrained output signal to the plurality of electricity generators to limit the variation in output power per unit of time according to the predetermined bound.

14. The system of claim 13, wherein the controller that processes the power signals is adapted to:
    determine a schedule power based on a predetermined bound for a variation in output power per unit of time with respect to an output power measured at an earlier unit of time;
    compute an error signal from a difference between the schedule power and a measured power; and
    process the error signal via a control algorithm of a controller to produce the output signal.

15. The system of claim 13, further comprising one or more sensors for monitoring power signals of the renewable energy installation by receiving one or more power signals.

16. The system of claim 13, wherein the constrained output signal comprises an active power setpoint adapted to control one or more operating parameters of one or more individual electricity generators in the renewable energy installation.

17. The system of claim 13, wherein the control device comprises a central controller operable to monitor and control a collective power output of the plurality of electricity generators in the renewable energy installation.

18. The system of claim 13, further comprising a memory for storing the predetermined bound for a variation in output power per unit of time prescribed by a utility grid.

19. The system of claim 18, wherein the predetermined bound comprises a bound whose output may not vary by more than a specified change in output power from an output power measured at a specified earlier unit of time.

20. The system of claim 13, wherein the controller is adapted to provide active power control via a control algorithm that includes one or more of proportional, integral, and derivative values applied to an input signal to produce the output signal.

21. The system of claim 13, further comprising constraining the output signal of the controller to a lower limit via the limiter, wherein the lower limit comprises a predetermined lower bound for a variation in output power per unit of time.

22. The system of claim 13, wherein constraining the output signal comprises:
   when the output signal remains at or below the upper bound, the constrained output signal of the limiter is equal to the output signal, and
   when the output signal exceeds the upper bound, the constrained output signal of the limiter is substantially constant and constrained to the upper bound value.

23. The system of claim 13, wherein the electricity generators comprise wind turbines.

24. The system of claim 13, wherein the control device is further operable to monitor and control an energy storage system of the renewable energy installation.

25. A non-transitory computer readable medium containing instructions that when executed by a processor perform acts for controlling the output power from a renewable energy installation, comprising instructions for:
   controlling an output power of a plurality of electricity generators using monitored power signals, wherein the controlling comprises:
   (a) processing the monitored power signals to produce an output signal;
   (b) constraining the output signal of the controller to an upper limit via a limiter, wherein the upper limit comprises a predetermined upper bound for a variation in output power per unit of time;
   (c) applying the constrained output signal to the plurality of electricity generators to limit the variation in output power per unit of time according to the predetermined bound.

26. The non-transitory computer readable medium of claim 25 wherein the plurality of electricity generators comprise wind turbines.

* * * * *